(12) United States Patent
Fontes

(10) Patent No.: US 6,398,038 B1
(45) Date of Patent: Jun. 4, 2002

(54) FILTRATION SYSTEM UTILIZING A VORTEX MECHANICAL POWER FILTER

(76) Inventor: Manuel J. Fontes, 4415 Venice Way, San Jose, CA (US) 95129

( * ) Notice: Subject to any disclaimer, the term of this patent is extended or adjusted under 35 U.S.C. 154(b) by 0 days.

(21) Appl. No.: 09/708,177

(22) Filed: Nov. 7, 2000

(51) Int. Cl.[7] ............................................. B01D 33/073
(52) U.S. Cl. .................... 210/354; 210/123; 210/242.1; 210/297; 210/393; 210/409; 210/499
(58) Field of Search .......................... 210/99, 107, 121, 210/123, 196, 242.1, 297, 391, 409, 512.1, 354, 167, 499, 131, 360.2, 393; 119/232, 227

(56) References Cited

U.S. PATENT DOCUMENTS

| | | | | |
|---|---|---|---|---|
| 2,685,371 A | * | 8/1954 | Gretzinger | 210/130 |
| 3,338,416 A | * | 8/1967 | Barry | 210/297 |
| 3,443,696 A | * | 5/1969 | Schutte | 200/83 A |
| 3,750,885 A | * | 8/1973 | Fournier | 210/107 |
| 4,271,018 A | * | 6/1981 | Drori | 210/107 |
| 5,293,839 A | * | 3/1994 | Jorgensen | 119/232 |
| 5,490,924 A | * | 2/1996 | Macia et al. | 210/257.1 |
| 5,896,593 A | * | 4/1999 | Mizrahi | 4/378 |

* cited by examiner

Primary Examiner—Joseph W. Drodge
Assistant Examiner—Terry K. Cecil
(74) Attorney, Agent, or Firm—The Kline Law Firm

(57) ABSTRACT

A vortex mechanical power filter includes a filter unit 12 arranged within a vortex tank 10 such that water to be filtered, e.g. flowing from a from a fish pond via gravity supply line 22, impinges upon a side of the filter unit at an angle to cause rotation thereof. The filter unit can also include a polyurethane ring float 121 so that the filter unit is self-adjusting within the vortex tank. Within the filter unit, a vortex disrupter 20 can be provided to aid in rotation thereof. As the system operates, a water jet assembly 18 sprays a plurality of water jets onto the filter screen to gently clean waste therefrom so that filtered water can be continuously provided.

22 Claims, 5 Drawing Sheets

FILTRATION SYSTEM UTILIZING A VORTEX MECHANICAL POWER FILTER

BACKGROUND OF THE INVENTION

1. Field of the Invention

The present invention relates generally to filtration systems, and more particularly is a filtration system in which a self-cleaning filter element is utilized in a vortex tank.

2. Description of the Prior Art

In any scenario in which large amounts of water are utilized, a filtering system is necessary to keep the water clean and free of contaminants. Such scenarios include swimming and wading pools, fountains, fish tanks and ponds, and other aquaculture applications. The present invention was developed specifically for fish tanks and ponds, but is clearly applicable in any application requiring high volume filtering.

Most filtering systems utilize a filter tank with a filtering medium suspended in an interior of the tank. The filtering medium must be formed from a particulate material so that water can flow through the medium. Some media commonly used for filtering are diatomaceous earth, sand, gravel, plastic pellets, and plastic mats. The filter media remove contaminants from the water by trapping the contaminating material on the individual particles of the filter medium. After the filter system has operated for some time, there is clearly the danger of the filter being clogged by the trapped contaminants. Therefore these types of filtering media require periodic cleaning.

The method most commonly used for cleaning the filter medium in a filter tank is backwashing. Backwashing typically involves simply reversing the direction of water flow through the interior of the filter tank so that the trapped particulate matter is washed back out of the tank. Apart from the aggregation problems inherent in the use of particulate media that reduces the cleaning effect of backwashing, backwashing by necessity involves shutting down the filtering system for at least some period of time. The system shutdown for maintenance must be scheduled at regular intervals. Cleaning a filtration system is thus susceptible to errors and omissions not only in the operation itself, but also in remembering to perform the operation at the proper intervals. Moreover, backwashing systems normally require large amounts of fresh water to operate.

Accordingly, it is an object of the present invention to provide a filtering method that gently removes particulate matter from an aquaculture system so that solid waste is not broken apart during the filtration process.

It is a further object of the present invention to provide a filtering device that is cost and energy efficient.

It is a still further object of the present invention to provide a filtering system that is compatible with both fresh and salt water applications, and is environmentally safe.

SUMMARY OF THE INVENTION

The present invention is a filtration system utilizing a vortex mechanical power filter. The filter unit is supported by a polyurethane ring float so that the filter unit is self-adjusting. That is, the filter unit will automatically come to a proper equilibrium level position irrespective of variations in the working water level in the system.

A single pump is used to move water through the system. Water to be filtered comes from a supply, typically a fish pond, via gravity feed to the filter unit. The supply line is situated so that the supplied water impinges the filter unit at an angle, supplying power to cause rotation of the filter unit. Additional power is supplied for rotation of the filter unit by a screen vortex disrupter that is placed in the center of the filter drum. The vortex disrupter transfers energy from the suction vortex caused by the pump drawing water through a center standpipe to the filter drum, further aiding rotation of the filter drum. The vortex disrupter maintains the vortex beneath the surface of the water so that the system does not suck air.

As the system operates, a water jet assembly sprays a plurality of water jets onto a filter screen to gently clean waste from the screen. The nozzle pressure and velocity of the jets are controlled by a flow valve and by varying nozzle sizes. The water jet assembly uses clean water diverted from the filter unit.

An advantage of the present invention is that the system operates continuously, with no need for backwashing.

Another advantage of the present invention is that the gentle cleaning action allows fecal waste to be removed from the water in the system without first breaking up the fecal matter.

A still further advantage of the present invention is that it can operate with a single pump.

Another advantage of the present invention is that it can be used in many different high volume applications with only minor changes in the design of the system.

Yet another advantage of the present invention is that it is compatible with both salt water and fresh water applications.

Still another advantage is that the filter system can be left unattended for long periods of time. The system requires only very low maintenance.

An additional benefit of the system is that the incoming water enriches the oxygen level, providing a "stew" for aerobic bacteria living on the micro screen filter.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
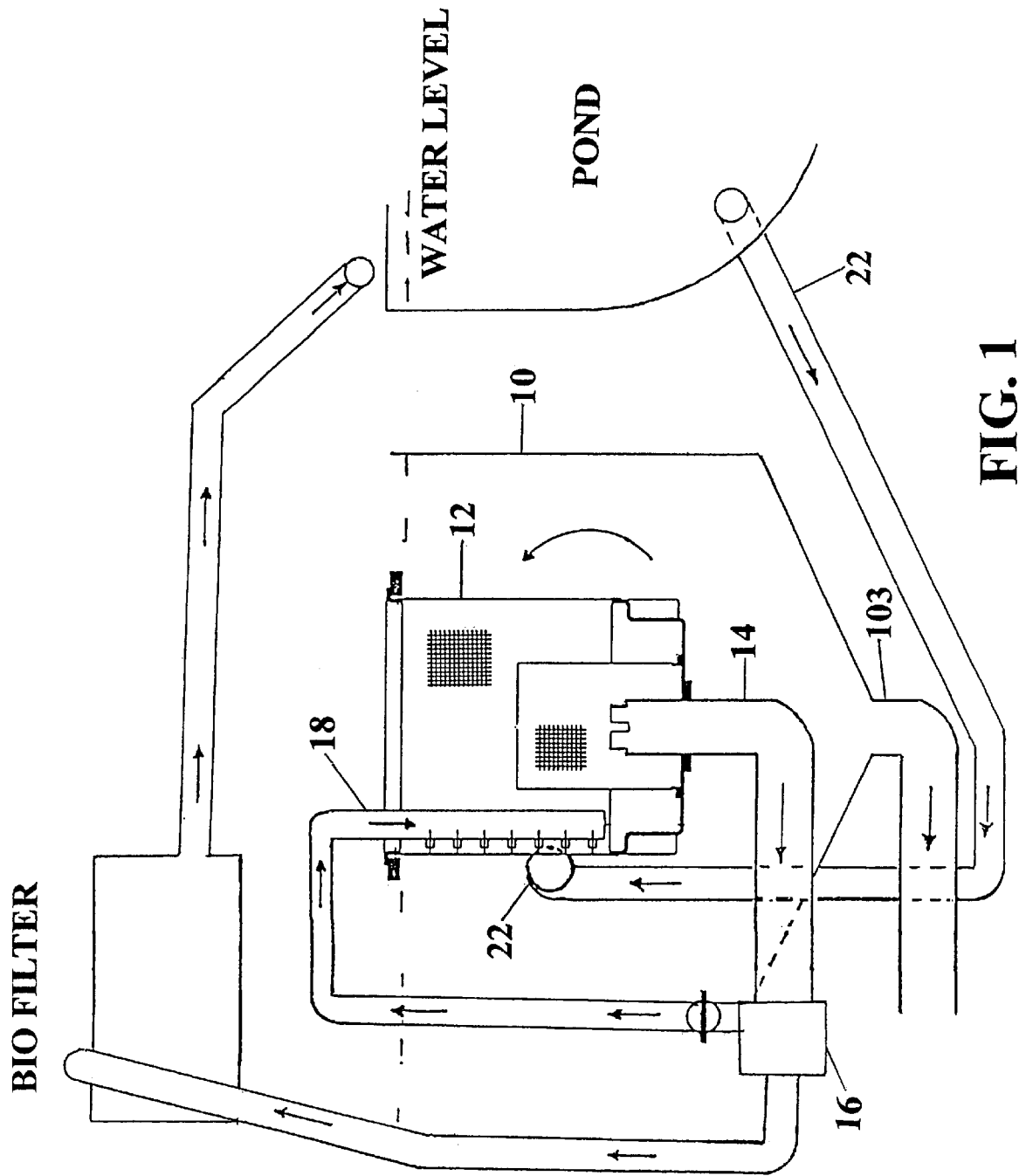
FIG. 1 is a schematic representation of the filtration system of the present invention installed in a fish pond.
Figure 2:
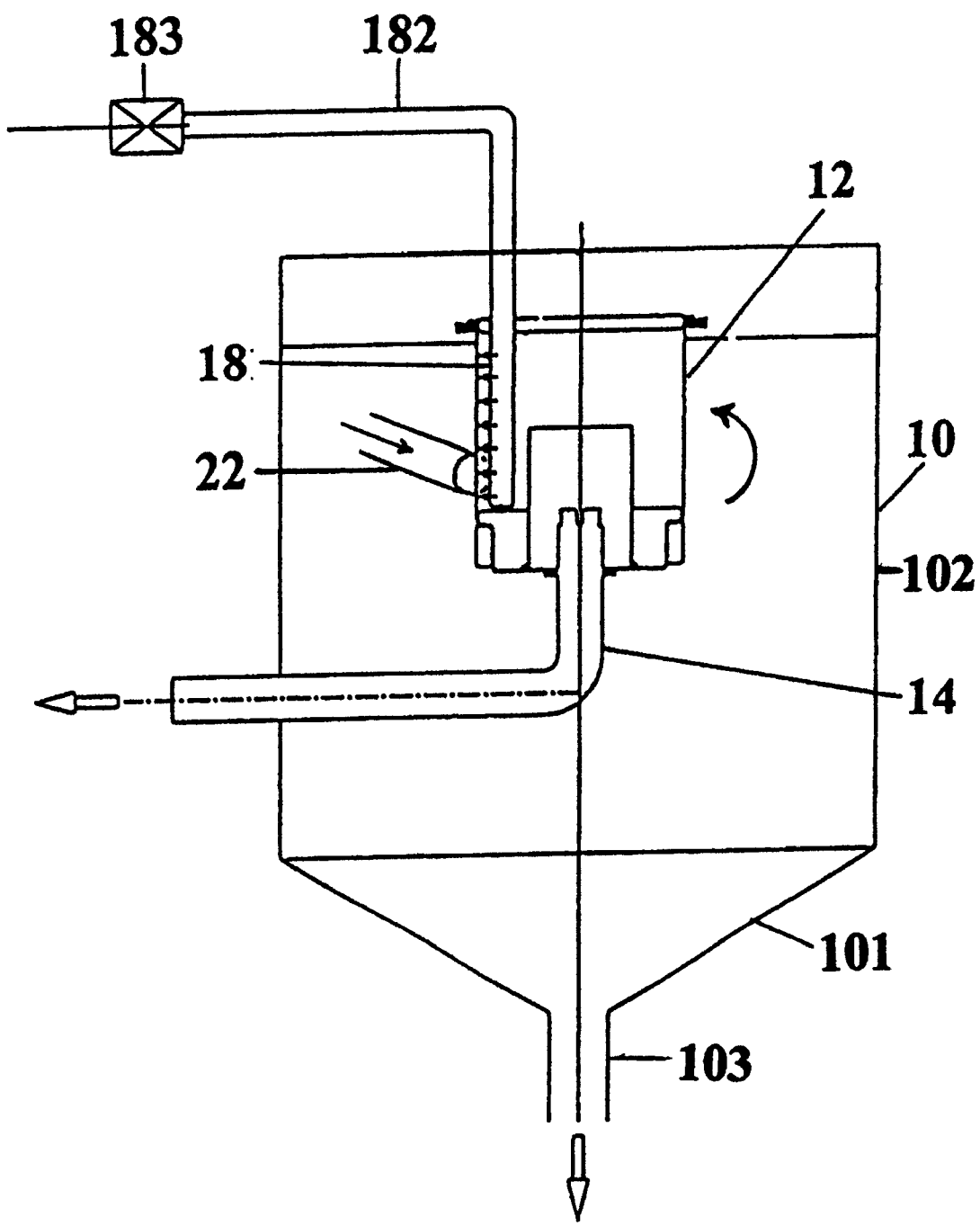
FIG. 2 is a front sectional view of the filtration unit of the system, showing the filter unit in position in the vortex tank.

The present invention is a filtration system utilizing a vortex mechanical power filter. While there are many applications that could easily utilize the principles of the present invention, the invention is disclosed herein with reference to a fish pond. Thus, referring first to FIGS. 1 and 2, the filtration system of the present invention includes a vortex tank 10 positioned so that it receives feed water by means of a gentle gravity flow from the fish pond or other water reservoir. The vortex tank 10 has a conical lower portion 101 and a cylindrical upper portion 102. A waste drain 103 is in communication with a waste disposal area, typically a sewer.

A filter unit 12 is mounted on a center standpipe 14 in the interior of the vortex tank 10. The filter unit 12 is supported by a float 121, so that the filter unit 12 is self-adjusting. That is, the filter unit 12 will automatically come to a proper equilibrium position regardless of the water level in the system. In the preferred embodiment, the float 121 is a polyurethane ring. The center standpipe 14 includes at a top end at least one anti-starve slot 141. In the preferred embodiment, four anti-starve slots are provided. The anti-starve slots 141 allow water to be drawn through the standpipe 14 into a pump 16 even in the event of a filter failure that blocks water flow through the filter unit 12. During a filter failure, i.e. should the micro screen become plugged, the filter unit 12 will float higher in the water, thereby causing water to enter the system through the anti-starve slots 141.

Figure 4:
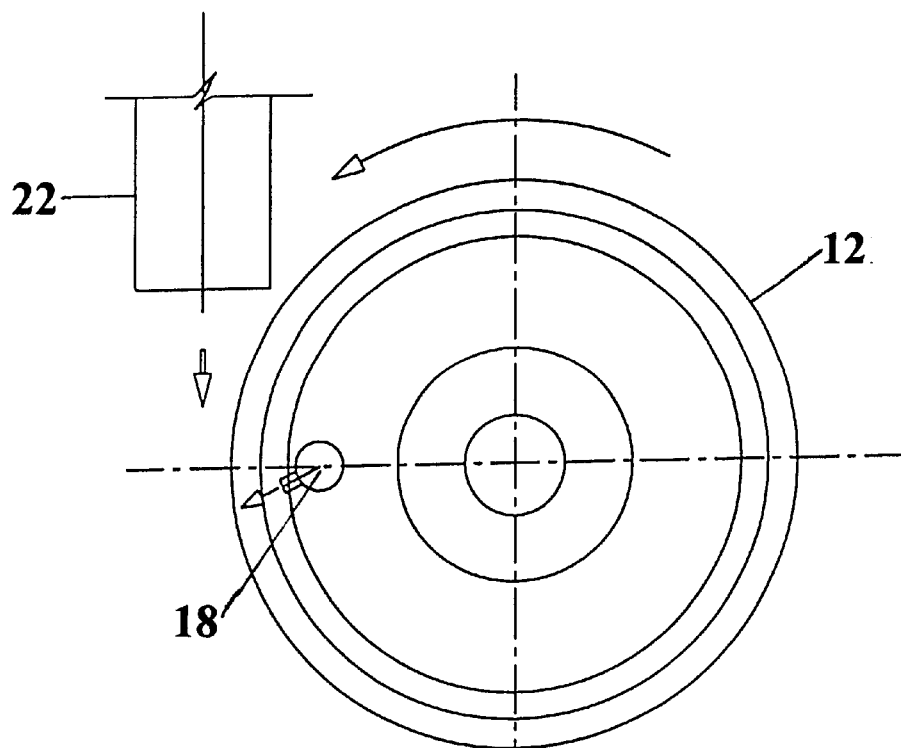
FIG. 4 is a top view of the filter unit.
Figure 3:
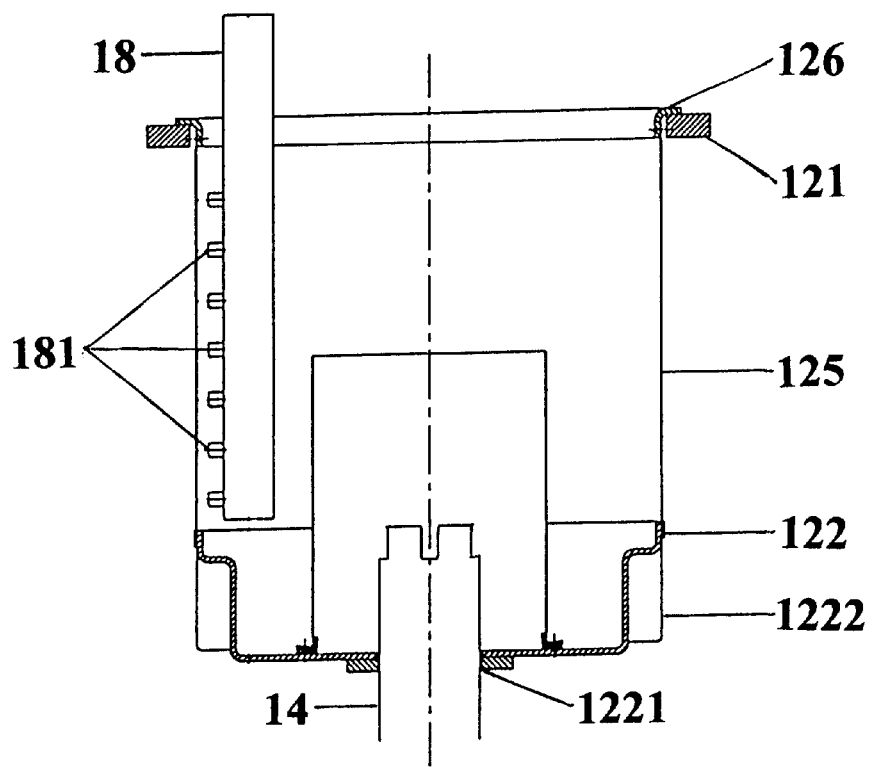
FIG. 3 is a front view of the filter unit of the present invention.
Figure 5:
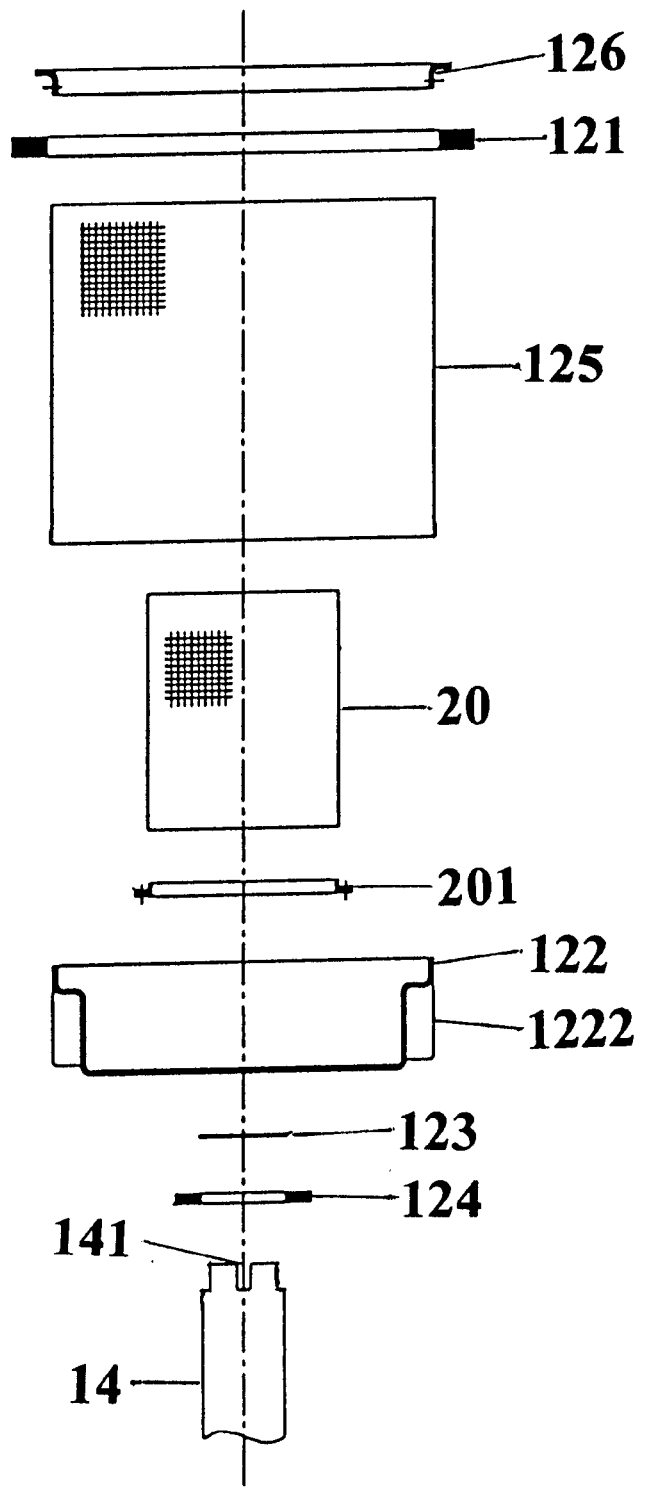
FIG. 5 is an exploded view of the filter unit.
Figure 7:
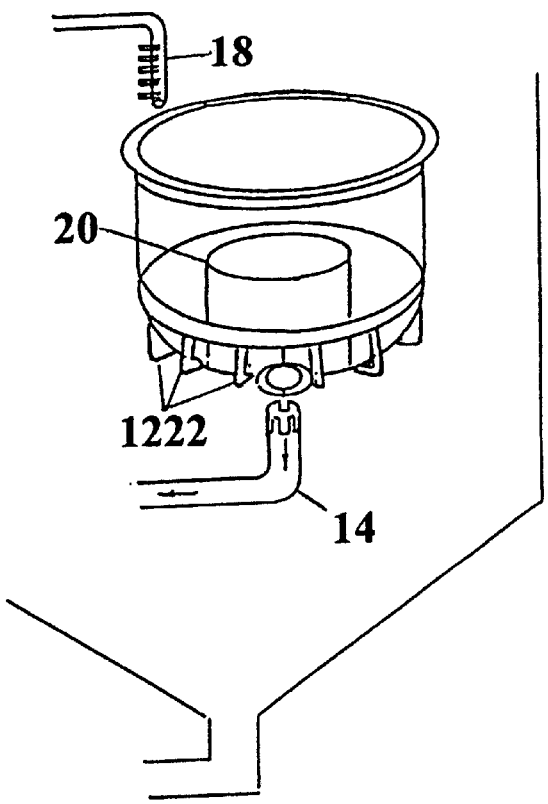
FIG. 7 is a perspective view of the filter unit installed in the vortex tank, with the water jet assembly lifted out of the base housing.
Figure 6:
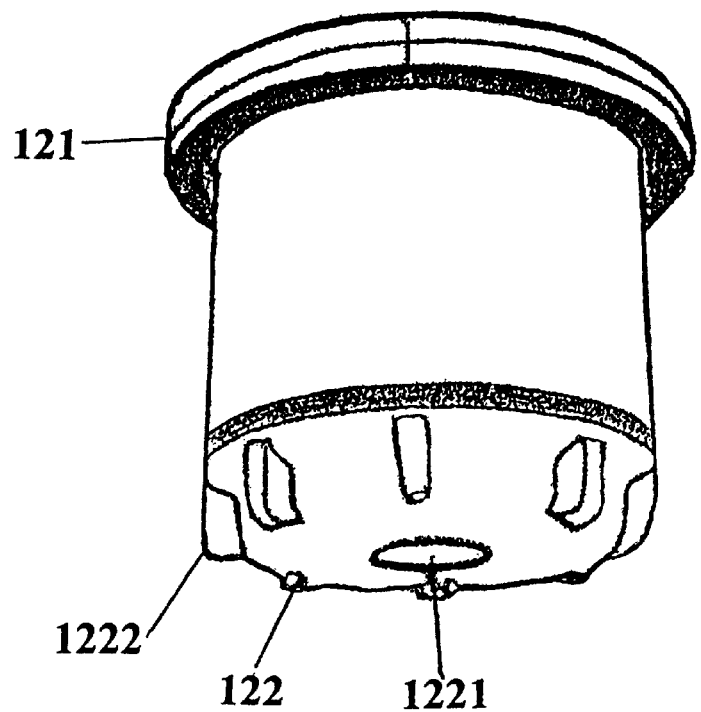
FIG. 6 is a perspective view of the base housing of the filter unit.

The filter unit 12, shown in detail in FIGS. 3–5, rests on a base housing 122 that includes a central through hole 1221 that is received on the center standpipe 14. A plurality of protruding fins 1222 on the base housing 122 aid in allowing the filter unit 12 to be rotated by the incoming water. The base housing 122 turns on a plastic water bearing 123, and the bearing/standpipe junction is sealed by a floating water bearing seal 124. The water bearing 123 is on the center standpipe 14 with a slip fit so that the filter unit 12 rotates on the center standpipe 14 with almost no resistance from the bearing 123. It is this slip fit assembly of the filter unit 12 on the center standpipe 14 that also allows the filter unit 12 to move up and down with the water level in the vortex tank 10.

The base housing 122 supports a mechanical micro screen 125. While the size of the screen can of course be varied according to the requirements of a particular application, in the preferred embodiment, the micro screen 125 is formed from a 500 micron size screen material. An upper float and screen frame 126 secures the filter unit assembly at a top end.

A water jet assembly 18 comprising a plurality of water jet nozzles 181 is rotatably mounted on a water line 182. The water line 182 carries clean water that has been pumped out of the filter unit 12 and diverted to the water jet assembly 18. The flow rate into the water jet assembly 18 is controlled by a valve 183. The nozzle pressure and velocity are controlled by varying the size of the nozzles 181. The water jet assembly sprays the already-cleaned water diverted from the filter unit 12 onto the filter screen 125 to gently clean waste from the screen 125.

The rotation of the filter unit 12 can be aided by installing a vortex disrupter 20 in the interior of the filter unit 12. In the preferred embodiment, the vortex disrupter 20 is formed from a screen material similar to that of screen 125. The vortex disrupter 20 is mounted over the center standpipe 14 by means of a vortex disrupter retainer 201. As water is pumped through the vortex tank 10, a vortex tends to be formed in the conical section 101 of the vortex tank 10. The vortex disrupter 20 in combination with the standpipe 14 creates an uninterrupted vortex beneath the surface of the water in the housing 122. This allows the system to avoid drawing air. The vortex disrupter 20 also transfers motive power from the vortex to the filter unit 12.

Due to the construction described above, a single pump 16 is used to move water through the filtration system of the present invention. Water to be filtered flows into the vortex tank 10 via gravity feed through a supply line 22. The supply line 22 is situated so that the supply water impinges the filter unit 12 at an angle. The incoming water contacts the fins 1222 of the base housing 122 and the filter screen 125, causing the filter unit 12 to rotate. Additional power is supplied for rotation of the filter unit 12 by the screen vortex disrupter 20 in the interior of the filter unit 12. The vortex disrupter 20 maintains the suction vortex beneath the water surface so that air is not drawn into the pump 16 while the pump 16 is pumping water through the vortex tank 10. The vortex disrupter 20 also diverts energy from the vortex to the filter unit 12, thereby aiding rotation of the filter unit 12.

As the water flows through the screen 125, waste material is trapped on the outer surface of the screen 125. The 181 water jet nozzles 18 of the water jet assembly 18 then gently wash the waste material from the screen 125, so that the waste material settles toward the bottom of the vortex tank 10. Additionally, the system utilizes an effect similar to that of air passing over an airfoil to further lift material from the filter screen 125. As the water flows around the curved surface of the filter screen 125, a low pressure area is created past the contact point of the water with the screen 125. The low pressure area serves as a vacuum to lift waste material off the surface of the filter screen 125. The waste material is then flushed out the drain 103 to the sewer.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A vortex mechanical power filter comprising:
   a water inlet means that draws water from a water supply,
   a recirculation water outlet means that returns filtered water to said water supply,
   a pump means to pump water,
   a vertically-oriented vortex tank, said vortex tank comprises a lower conical portion and a cylindrical upper portion, said vortex tank further includes a drain means at a lower end,
   a filter unit mounted on a standpipe in an interior of said vortex tank, said filter unit having a vertical axis of rotation and comprising a cylindrical filter screen, and
   a water jet assembly situated within said cylindrical filter screen and comprising at least one water jet nozzle; wherein
   water to be filtered flows into said vortex tank through said water inlet means, said water inlet means being positioned such that said water to be filtered impinges a side of said filter unit at an angle causing said filter unit to rotate without aid of a motor, waste material being removed from said water to be filtered as said water to be filtered flows through said filter screen, said waste material being gently and continuously removed from said filter screen by water directed by said water jet nozzle, said waste material passing out of said vortex tank through said drain means.

2. The vortex mechanical power filter of claim 1 wherein:
   said filter unit comprises a float means, said float means causing a vertical position of said filter unit on said standpipe to vary with a level of water in said vortex tank, such that said vertical position of said filter unit is self-adjusting.

3. The vortex mechanical power filter of claim 2 wherein:
said float means is a polyurethane ring.
4. The vortex mechanical power filter of claim 1 wherein:
a low pressure area is formed by water flowing past said filter unit such that said waste material tends to be lifted from said filter screen.
5. The vortex mechanical power filter of claim 1 wherein:
said standpipe includes at least one anti-starve slot, said anti-starve slot allows water to be drawn through said standpipe into said pump when water flow through said filter unit is interrupted.
6. The vortex mechanical power filter of claim 1 wherein:
a base housing of said filter unit comprises a plurality of fins, said fins being positioned in line with said water inlet means such that said water to be filtered contacts said fins, thereby aiding rotation of said filter unit.
7. The vortex mechanical power filter of claim 6 wherein:
said filter unit further comprises a plastic water bearing, a floating water bearing seal that seals a bearing/standpipe junction, and an upper float and screen frame that secures said float and said filter screen to said filter unit at a top end of said filter unit.
8. The vortex mechanical power filter of claim 1 wherein:
said water jet assembly comprises a plurality of water jet nozzles pivotably mounted on a water line, said water line carries clean water that has been pumped out of said filter unit and diverted to said water jet assembly.
9. The vortex mechanical power filter of claim 8 wherein:
a flow rate into said water jet assembly is controlled by a valve in said water line, and pressure and velocity of water emitted from said water jet nozzles is controlled by varying a size of said water jet nozzles, said size being chosen so that said water jet assembly gently removes waste from said filter screen.
10. The vortex mechanical power filter of claim 1 wherein:
rotation of said filter unit is aided by a vortex disrupter installed in said interior of said filter unit, said vortex disrupter disrupts a vortex pattern formed in said vortex tank and transfers motive power from said disruption of said vortex pattern to said filter unit.
11. The vortex mechanical power filter of claim 1 wherein:
water flows into said vortex tank from a supply reservoir through said water inlet means via gravity feed.
12. A filtration system comprising:
a supply reservoir containing water to filtered, a bio-filter means, and a vortex mechanical power filter comprising:
a water inlet means that draws water from a water supply,
a recirculation water outlet means that returns filtered water to said water supply,
a pump means to pump water,
a vertically-oriented vortex tank, said vortex tank comprises a lower conical portion and a cylindrical upper portion, said vortex tank further includes a drain means at a lower end,
a filter unit mounted on a standpipe in an interior of said vortex tank, said filter unit having a vertical axis of rotation and comprising a cylindrical filter screen, and
a water jet assembly situated within said cylindrical filter screen and comprising at least one water jet nozzle; wherein
water to be filtered flows into said vortex tank through said water inlet means, said water inlet means being positioned such that said water to be filtered impinges a vertical side of said filter unit at an angle causing said filter unit to rotate without aid of a motor, waste material being removed from said water to be filtered as said water to be filtered flows through said filter screen, said waste material being gently and continuously removed from said filter screen by water directed by said water jet nozzle, said waste material passing out of said vortex tank through said drain means; such that
a single pump causes water to flow from said supply reservoir through said vortex mechanical power filter and through said bio-filter means.
13. The filtration system of claim 12 wherein:
said filter unit of said vortex mechanical power filter comprises a float means, said float means causing a vertical position of said filter unit on said standpipe to vary with a level of water in said vortex tank, such that said vertical position of said filter unit is self-adjusting.
14. The filtration system of claim 13 wherein:
said float means is a polyurethane ring.
15. The filtration system of claim 12 wherein:
a low pressure area is formed by water flowing past said filter unit such that said waste material tends to be lifted from said filter screen.
16. The filtration system of claim 12 wherein:
said standpipe includes at least one anti-starve slot, said anti-starve slot allows water to be drawn through said standpipe into said pump when water flow through said filter unit is interrupted.
17. The filtration system of claim 12 wherein:
a base housing of said filter unit comprises a plurality of fins, said fins being positioned in line with said water inlet means such that said water to be filtered contacts said fins, thereby aiding rotation of said filter unit.
18. The filtration system of claim 17 wherein:
said filter unit further comprises a plastic water bearing, a floating water bearing seal that seals a bearing/standpipe junction, and an upper float and screen frame that secures said float and said filter screen to said filter unit at a top end of said filter unit.
19. The filtration system of claim 12 wherein:
said water jet assembly comprises a plurality of water jet nozzles mounted on a water line 9 said water line carries clean water that has been pumped out of said filter unit and diverted to said water jet assembly.
20. The filtration system of claim 19 wherein:
a flow rate into said water jet assembly is controlled by a valve in said water line, and pressure and velocity of water emitted from said water jet nozzles is controlled by varying a size of said water jet nozzles, said size being chosen so that said water jet assembly gently removes waste from said filter screen.
21. The filtration system of claim 12 wherein:
rotation of said filter unit is aided by a vortex disrupter installed in said interior of said filter unit, said vortex disrupter disrupts a vortex pattern formed in said vortex tank and transfers motive power from said disruption of said vortex pattern to said filter unit.
22. The filtration system of claim 12 wherein:
water flows into said vortex tank from said supply reservoir via gravity feed.

* * * * *